(12) United States Patent
Mar

(10) Patent No.: US 7,200,092 B2
(45) Date of Patent: Apr. 3, 2007

(54) METHOD AND DEVICE FOR ADJUSTING REFERENCE LEVEL

(75) Inventor: William Mar, Taipei (TW)

(73) Assignee: Via Technologies, Inc., Taipei (TW)

( * ) Notice: Subject to any disclaimer, the term of this patent is extended or adjusted under 35 U.S.C. 154(b) by 631 days.

(21) Appl. No.: 10/670,593

(22) Filed: Sep. 25, 2003

(65) Prior Publication Data

US 2004/0062167 A1    Apr. 1, 2004

(30) Foreign Application Priority Data

Sep. 27, 2002    (TW) ............................... 91122413 A

(51) Int. Cl.
*G11B 7/005* (2006.01)
(52) U.S. Cl. ............................. 369/59.15; 369/59.21; 369/59.18
(58) Field of Classification Search ............. 369/59.15
See application file for complete search history.

(56) References Cited

U.S. PATENT DOCUMENTS

| | | | | | |
|---|---|---|---|---|---|
| 4,786,794 | A | * | 11/1988 | Doi ......................... 250/201.4 |
| 6,249,496 | B1 | * | 6/2001 | Tsukahara et al. ........ 369/44.28 |
| 6,272,105 | B1 | * | 8/2001 | Hayashi ..................... 369/275.3 |
| 7,065,027 | B2 | * | 6/2006 | Cheng et al. ............. 369/59.18 |

\* cited by examiner

*Primary Examiner*—Wayne Young
*Assistant Examiner*—Van T. Pham

(57) ABSTRACT

A method for adjusting a reference level of an analog signal from a plurality of periodically sampled points includes the following steps. Firstly, a first level shift from an preliminary reference level to the last second sampled point within a specified period and a second level shift from the preliminary reference level to the last sampled point within the specified period is determined when one of a first level of the last second sampled point and a second level of the last sampled point is higher than the preliminary reference level and the other is lower than the preliminary reference level. Then, the preliminary reference level is moved toward the first level when an absolute value of the first level shift is greater than an absolute value of the second level shift, and the preliminary reference level is moved toward the second level when the absolute value of the first level shift is less than the absolute value of the second level shift, thereby defining an adjusted reference level.

20 Claims, 7 Drawing Sheets

METHOD AND DEVICE FOR ADJUSTING REFERENCE LEVEL

FIELD OF THE INVENTION

The present invention relates to a method and a device for adjusting a reference level, and more particularly to a method and a device for adjusting a reference level in a photoelectric apparatus such as an optical disc drive.

BACKGROUND OF THE INVENTION

Optical disks such as compact disks (CDs), video compact disks (VCDs) and digital versatile disks (DVDs) are widely employed to store considerable digital data due to features of high capacity and portability. Accordingly, optical disk drives have become essential to personal computers. In order to enhance reproducing quality of the optical storage media, it is required to accurately and quickly read out the stored digital data. When an optical disk drive operates to read data from an optical disk, a laser beam emitted by a laser diode of the pickup head is focused onto the surface of the optical disk at a focusing point where the desired data is stored. There are plural pits and lands of various lengths on the surface of the optical disk. Due to the uneven profile, a portion of the laser beam will be reflected by the optical disk but the other will not. The laser beam portion reflected back to the pickup head and received by a photo sensor in the pickup head is converted into a corresponding radio frequency (RF) signal by subsequent circuit, which is provided for an actuating device of the optical disk drive.

Please refer to FIG. 1(a). A conventional digital data processing system for use in an optical disk drive comprises an analog-to-digital converter (ADC) 10, a retiming system circuit 11, a zero-crossing level tracking circuit 12 and a detector 13. The ADC 10 is used to periodically sample and convert the received RF analog signals into corresponding sampled signals in digital forms. The sampled signals are then checked by the retiming system circuit 11 to realize whether the features of the RF analog signals are retained. If not, the above procedures will be done again so as to obtain optimized sampled signals. Then, by means of the zero-crossing level tracking circuit 12, a zero crossing level is determined from the sampled signals. The zero crossing level is used as a reference level in the detector 13. According to the sampled signals' levels relative to the reference level, the detector 13 will output either a high level or a low level signal.

FIG. 1(b) illustrates another conventional digital data processing system. The digital data processing system comprises an analog-to-digital converter (ADC) 10, a phase-locked loop circuit 15, a zero-crossing level tracking circuit 12 and a detector 13. The ADC 10 is used to periodically sample and convert the received RF analog signals into corresponding sampled signals in digital forms according to the phase-lock loop circuit 15. The period for sampling the RF analog signals is determined by the phase-lock loop circuit 15 on the basis of waveform features and floating degrees of these RF analog signals. The operation principles of the zero-crossing level tracking circuit 12 and detector 13 are similar to those of FIG. 1(a).

The algorithm adopted by the zero-crossing level tracking circuit 12 to locate the zero crossing level will be illustrated as follows. Firstly, an initial reference level C is given. When a new sampled signal is generated, the total number of sampled signals generated within last certain time range and including the new sampled one are counted. The number of the sampled signals having levels greater than the initial reference level C is counted as A, whereas the number of the sampled signals having levels less than the initial reference level C is counted as B. If A>B, the reference level is adjusted to a value (C+D), where D is a constant positive value. On the contrary, if A<B, the reference level is adjusted to a value (C−D).

After the next sampled signal is received by the zero-crossing level tracking circuit 12, the above procedures are repeated to obtain a new reference level until the number of sampled signals having levels greater than the new reference level equals to the number of sampled signals having levels less than the new reference level. This new reference level is defined as the zero crossing level.

The above algorithm for locating the zero crossing level is considerably rough. For example, the zero crossing level may be converged to different values for different starting sampled signal. Referring to FIG. 1(c), when it is a sampled signal having a level higher than the initial reference level selected as the starting sampled signal, a relatively high first zero crossing level ZCL1 as shown will be obtained. On the contrary, when it is a sampled signal having a level lower than the initial reference level selected as the starting sampled signal, a relatively low third zero crossing level ZCL3 will be obtained. The realization of both of the first and the third zero crossing levels ZCL1 and ZCL3 complies with the above-described algorithm but deviates from the ideal second zero crossing level ZCL2 significantly. In addition, since the zero crossing levels ZCL1 and ZCL3 are close to either side of the sampled signals, the signals read by the optical pickup head might float due to noise resulting from unexpected interference during the data pickup process or trembling pickup head resulting from unstable current for actuating the pickup head. Accordingly, the first and the third zero crossing levels ZCL1 and ZCL3 are even unreliable so as to adversely affect the judgment of the detector 13.

SUMMARY OF THE INVENTION

It is an object of the present invention to a method and a device for adjusting a reference level of an analog signal so as to increase accurate data transmission.

In accordance with a first aspect of the present invention, there is provided a method for adjusting a reference level of an analog signal from a plurality of periodically sampled points. The method comprises the following steps. Firstly, an initial reference level is preset. Then, a first number of sampled points having levels higher than the initial reference level are compared with a second number of sampled points having levels lower than the initial reference level within a specified period. The initial reference level is raised when the first number is greater than the second number, and lowered when the first number is less than the second number, thereby obtaining a new reference level, and defining the new reference level as a first-stage reference level. Then, a first level shift from the first-stage reference level to the last second sampled point within the specified period and a second level shift from the first-stage reference level to the last sampled point within the specified period are determined when one of a first level of the last second sampled point and a second level of the last sampled point is higher than the first-stage reference level and the other is lower than the first-stage reference level. Afterward, the first-stage reference level is moved toward the first level when an absolute value of the first level shift is greater than an absolute value of the second level shift, and the first-stage reference level is moved toward the second level when the absolute value of the first level shift is less than the absolute value of the second level shift, thereby defining a second-stage reference level.

In an embodiment, the first-stage reference level is defined by adding a positive constant value to the initial reference level when the first number is greater than the second number or subtracting the positive constant value from the initial reference level when the first number is less than the second number.

In an embodiment, the second-stage reference level is obtained by steps of summing the first level shift and the second level shift to obtain a sum of shift, multiplying the sum of shift by an adjusting parameter to obtain a shifting value, and summing the first-stage reference level and the shifting value to obtain the second-stage reference level.

In an embodiment, the steps are repeated for next sampled point by using the second-stage reference level as the initial reference level.

In an embodiment, the step of comparing the first number with the second number and the step of raising/lowering the initial reference level are repetitively performed with the new reference level in lieu of the initial reference level until the first number is equal to the second number, and the latest reference level resulting in the equality of the first number to the second number is defined as the first-stage reference level.

In an embodiment, the method is used in a photoelectric system, wherein the analog signal is a radio frequency (RF) signal.

In an embodiment, the method is used in a photoelectric system, wherein the reference level to be adjusted is a zero-crossing level.

In an embodiment, the method is used in a photoelectric system, wherein the photoelectric system is a compact disk-read only memory (CD-ROM) drive, a compact disk-rewritable (CD-RW) drive, a digital versatile disk-read only memory (DVD-ROM) drive, a digital versatile disk-recordable (DVD-R) drive, a digital versatile disk-rewritable (DVD-RW) drive or a digital versatile disk-random access memory (DVD-RAM) drive.

In accordance with a second aspect of the present invention, there is provided a method for adjusting a reference level of an analog signal from a plurality of periodically sampled points. The analog signal is generated by a photoelectric system. The method comprises the following steps. Firstly, a first level shift from an preliminary reference level to the last second sampled point within a specified period and a second level shift from the preliminary reference level to the last sampled point within the specified period is determined when one of a first level of the last second sampled point and a second level of the last sampled point is higher than the preliminary reference level and the other is lower than the preliminary reference level. Then, the preliminary reference level is moved toward the first level when an absolute value of the first level shift is greater than an absolute value of the second level shift, and the preliminary reference level is moved toward the second level when the absolute value of the first level shift is less than the absolute value of the second level shift, thereby defining an adjusted reference level.

In an embodiment, the raising or lowering step of the preliminary reference value comprises sub-steps of summing the first level shift and the second level shift to obtain a sum of shift, multiplying the sum of shift by an adjustment parameter to obtain a shifting value, and summing the preliminary reference level and the shifting value to obtain the adjusted reference level.

In an embodiment, the method for adjusting the reference level further comprises a step of obtaining the preliminary reference level by sub-steps of presetting an initial reference level, comparing a first number of sampled points having levels higher than the initial reference level with a second number of sampled points having levels lower than the initial reference level within the specified period, and adding a positive constant value to the initial reference level to obtain the preliminary reference level when the first number is greater than the second number, and subtracting the positive constant value from the initial reference level to obtain the preliminary reference level when the first number is less than the second number.

In an embodiment, the method for adjusting the reference level further comprises a step of obtaining the preliminary reference level by the following sub-steps. Firstly, a first number of sampled points having levels higher than an initial reference level are compared with a second number of sampled points having levels lower than the initial reference level within the specified period. Then, a positive constant value is added to the initial reference level when the first number is greater than the second number, and the positive constant value is subtracted from the initial reference level when the first number is less than the second number, thereby obtaining a new reference level. Then, the new reference level is used in lieu of the initial reference level, and the above steps repeated until the first number is equal to the second number. Afterward, the latest reference level resulting in the equality of the first number to the second number is defined as the preliminary reference level.

In accordance with a third aspect of the present invention, there is provided a digital signal processing device for use in a photoelectric system. The digital signal processing device comprises an analog-to-digital converter, a zero-crossing level tracking circuit and a detector. The analog-to-digital converter is used for converting an analog signal into a plurality of periodically sampled signals in digital forms. The zero-crossing level tracking circuit is in communication with the analog-to-digital converter, and determines a first level shift from an preliminary reference level to the last second sampled point within a specified period and a second level shift from the preliminary reference level to the last sampled point within the specified period when one of a first level of the last second sampled point and a second level of the last sampled point is higher than the preliminary reference level and the other is lower than the preliminary reference level, wherein the zero-crossing level tracking circuit moves the preliminary reference level toward the first level when an absolute value of the first level shift is greater than an absolute value of the second level shift, and moves the preliminary reference level toward the second level when the absolute value of the first level shift is less than the absolute value of the second level shift, thereby defining an adjusted reference level. The detector is in communication with the zero-crossing level tracking circuit, and determines a level of an input signal based on the adjusted reference level.

In an embodiment, the digital signal processing device further comprises a retiming system circuit in communication with the analog-to-digital converter for checking the sampled signals to determine whether the features of the analog signal are retained.

In an embodiment, the digital signal processing device further comprises a phase-locked loop circuit in communication with the analog-to-digital converter, generating a clock signal referenced by the analog-to-digital converter to generate the periodically sampled signals.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1A:
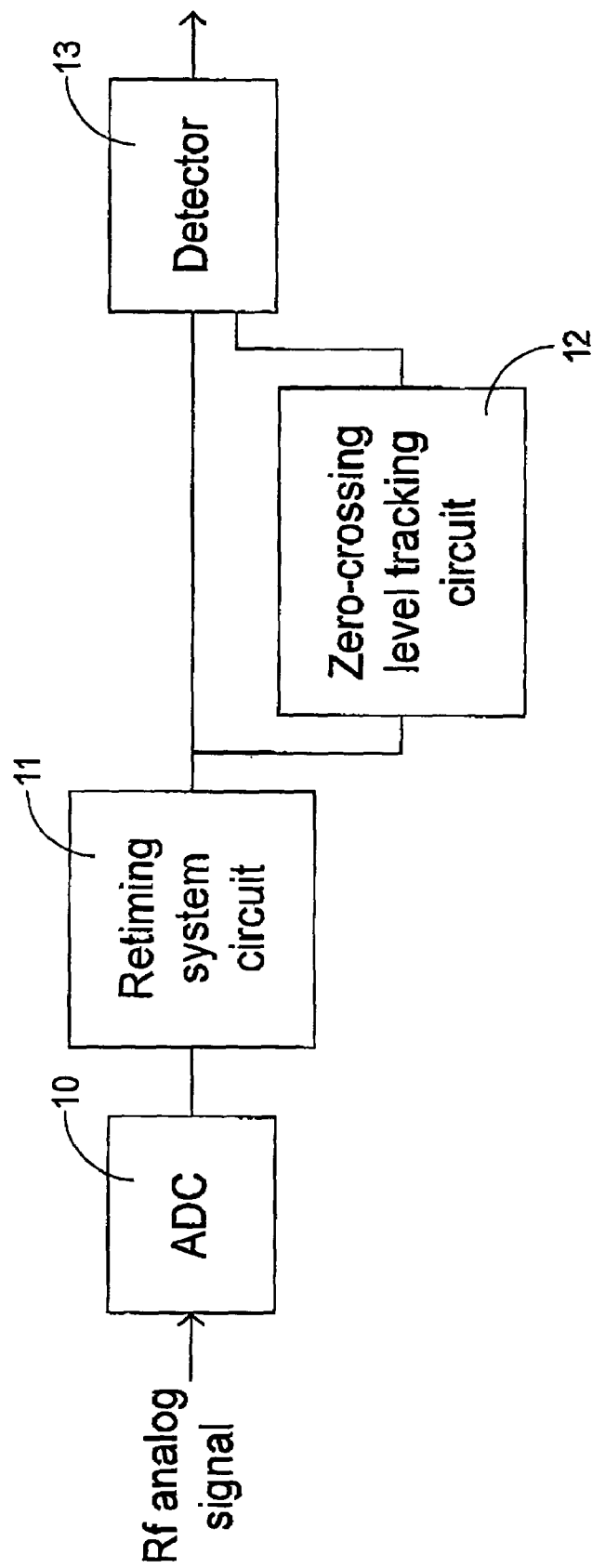
FIG. 1(a) is a functional block diagram illustrating a conventional digital data processing system.
Figure 1B:
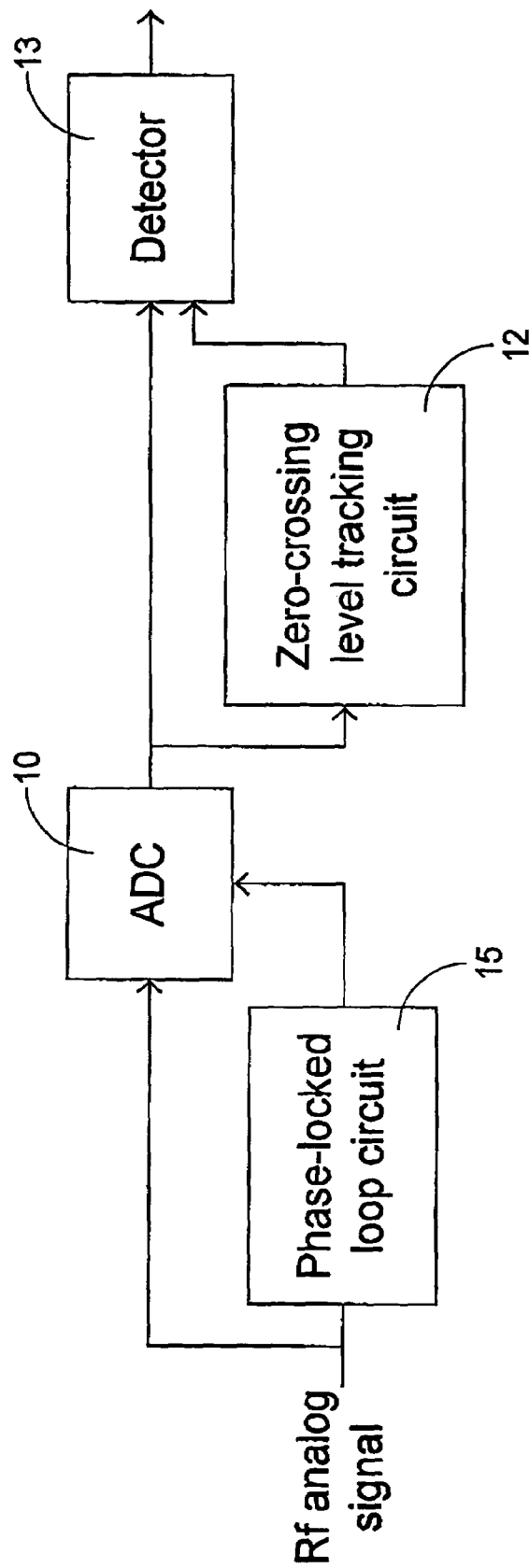
FIG. 1(b) is a functional block diagram illustrating another conventional digital data processing system.
Figure 1C:
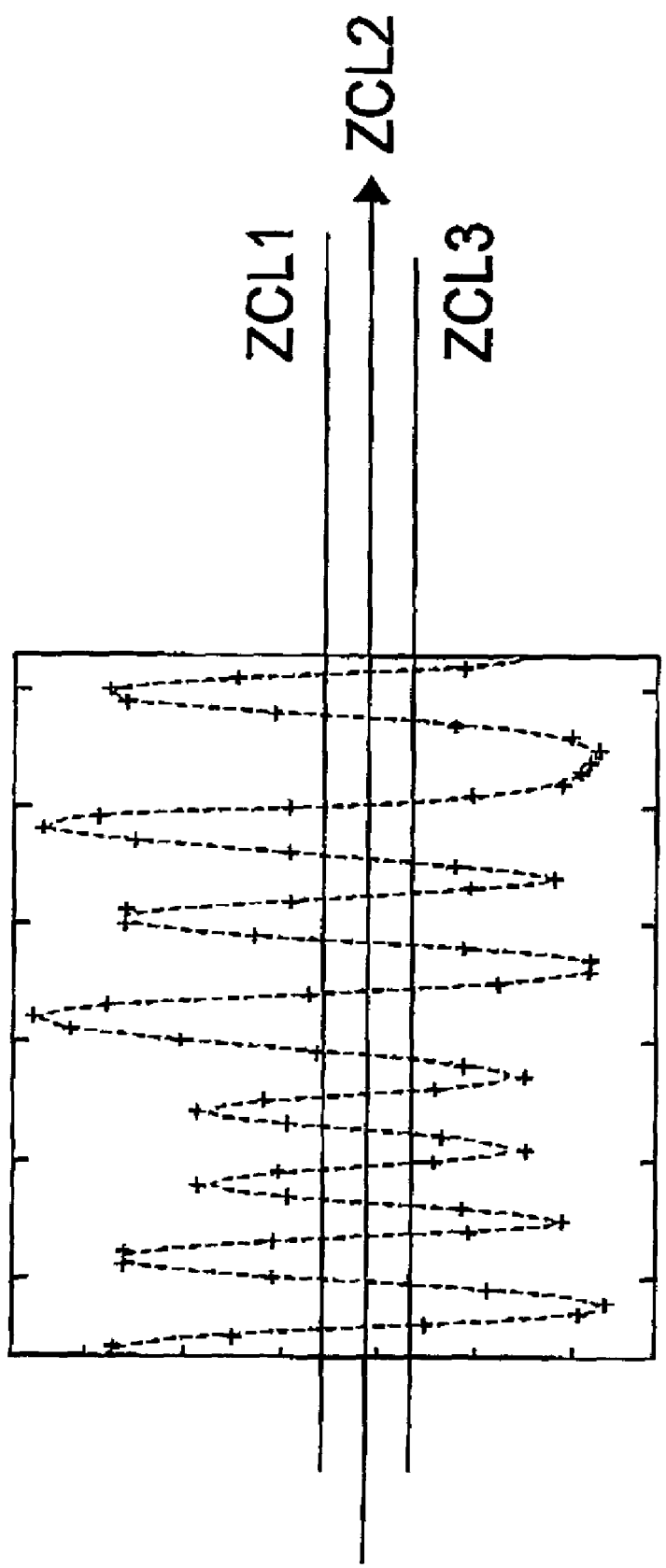
FIG. 1(c) is a plot illustrating level distribution of sampled signals and the derived zero crossing levels.
Figure 2A:
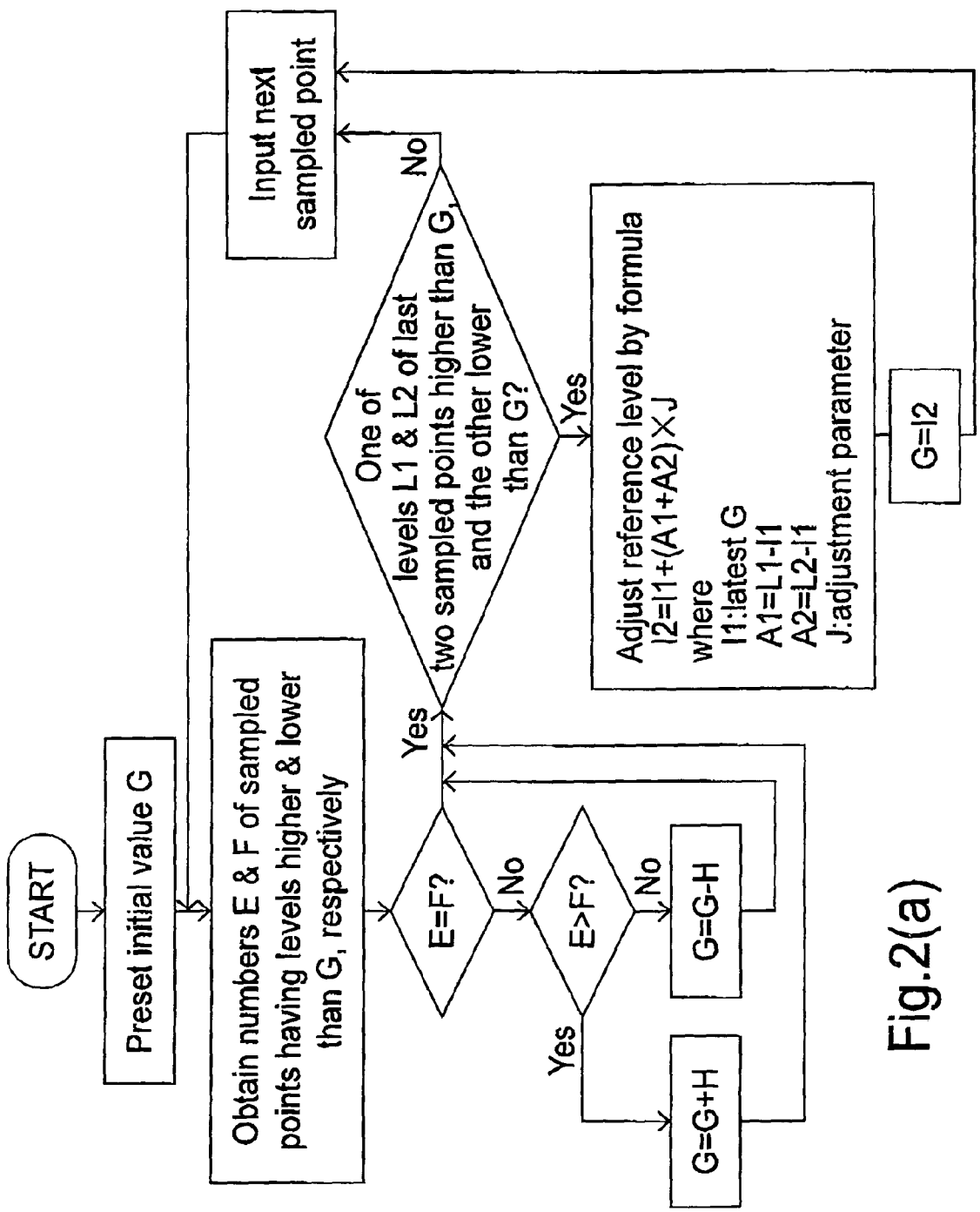
FIG. 2(a) is a flowchart illustrating a method for adjusting a reference level according to a preferred embodiment of the present invention.

The digital signal processing device for adjusting a reference level according to the present invention comprises elements similar to those of FIGS. 1 or 2, and the functions and operations of these elements are also similar to those in FIGS. 1 or 2 except the zero-crossing level tracking circuit in order to effectively obtain the ideal zero crossing level, as indicated by the reference ZCL2 as shown in FIG. 1(c). The method for locating a reference level of a radio frequency (RF) signal from a plurality of periodically sampled points comprises a rough-tuning procedure and a fine-tuning procedure. A flowchart of the method according to a preferred embodiment of the present invention is shown in FIG. 2(a). In this embodiment, the rough-tuning procedure and the fine-tuning procedure are performed sequentially for each sampled point.

In the rough-tuning procedure, an initial reference level G is firstly given. When a new sampled signal is generated, the total number of sampled signals generated within last certain time range and including the new sampled one are counted. The number of the sampled signals having levels greater than the initial reference level G is counted as E, whereas the number of the sampled signals having levels less than the initial reference level G is counted as F. If E=F, the reference level G is defined as a first-stage reference level I1 for the fine-tuning procedure I1. If E>F, the first-stage reference level I1 is defined as the sum of the initial reference level G and a constant positive value H, i.e. I1=G+H. On the contrary, if E<F, the first-stage reference level I1 is defined as the difference of the initial reference level G and the constant positive value H, i.e. I1=G−H.

In the fine-tuning procedure, the first-stage reference level is adjusted to obtain a second-stage reference level even approximating the ideal reference level according to the following algorithm. When the levels of the last sampled signal and the last second sampled signal within the specified period lie in opposite sides of the first-stage reference level, i.e. one of the levels of the last second sampled signal and the last sampled signal is greater than the first-stage reference level I1 and the other is less than I1, a first level shift A1 from the first-stage reference level I1 to the level L1 of the last second sampled signal and a second level shift A2 from the first-stage reference level I1 to the level L2 of the last sampled point are determined. Then, a formula I2=I1+(A1+A2)×J is operated to obtain the second-stage reference level I2, where J is an adjustment parameter, and A1=L1−I1, and A2=L2−I1. When the absolute value of the first level shift A1 is greater than the absolute value of the second level shift A2, it means the second-stage reference level 12 is obtained by moving the first-stage reference level I1 toward the level L1 according to the formula. On the contrary, when the absolute value of the first level shift A1 is less than the absolute value of the second level shift A2, the first-stage reference level I1 is moved toward the level L2 to define the second-stage reference level 12 according to the formula. The above steps are repeated for next sampled point by using the second-stage reference level as the initial reference level.

Figure 2B:
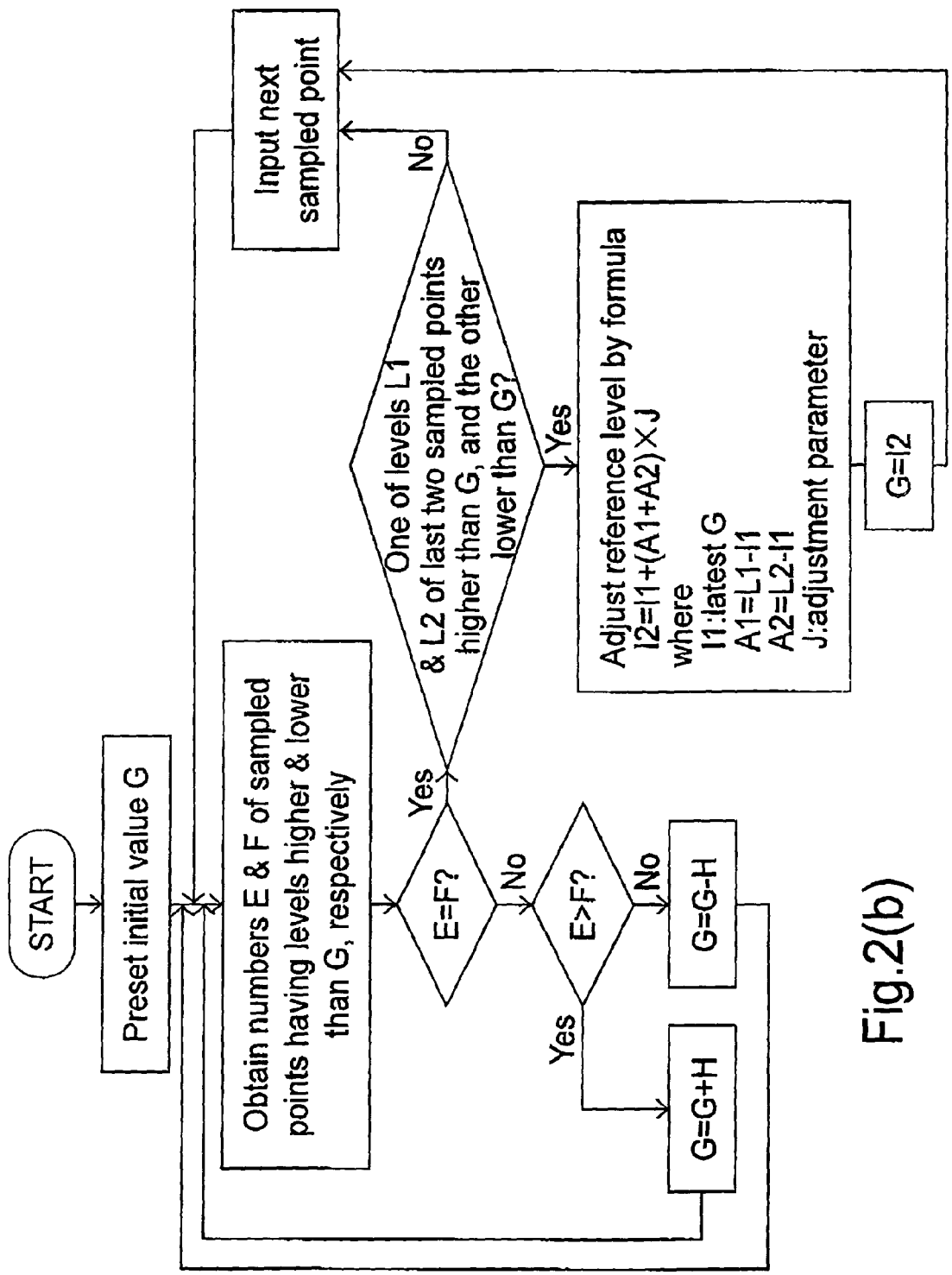
FIG. 2(b) is a flowchart illustrating a method for adjusting a reference level according to another preferred embodiment of the present invention.

A flowchart of the method according to another preferred embodiment of the present invention is shown in FIG. 2(b). In this embodiment, the rough-tuning procedure is repetitively performed with the latest reference level replacing for the previous reference level to define the first-stage reference level I1 until the numbers E and F of the sampled signals having levels higher and lower than the initial reference level G, respectively, are equal to each other. Whenever E is larger than F, the latest reference level is raised by the constant positive value H, while the latest reference level is lowered by the constant positive value H whenever E is smaller than F. After the first-stage reference level I1 is defined on the condition that E is equal to F, the fine-tuning procedure is performed as the above embodiment to define the second-stage reference level 12.

Figure 3:
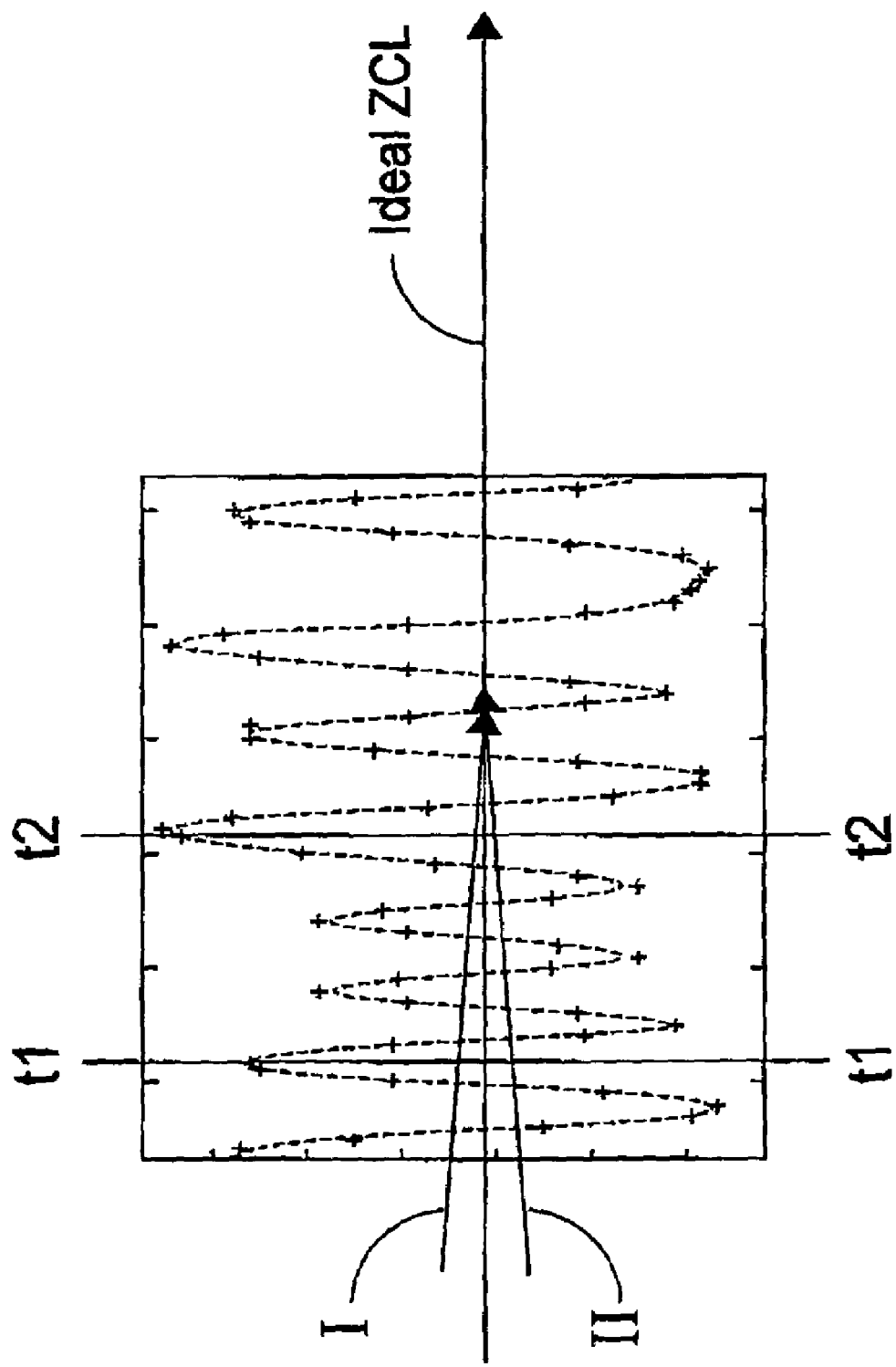
FIG. 3 is a plot illustrating convergence of reference level distribution according to the method of the present invention.

The above method for locating the zero crossing level converges the zero crossing level to a desired value approximating the ideal zero crossing level for different starting sampled points. Referring to FIG. 3, when a sampled signal having a level higher than the initial reference level is selected as the starting sampled signal, the zero crossing level converges to the ideal value ZCL along the line I. On the contrary, when a sampled signal having a level lower than the initial reference level selected as the starting sampled signal, the zero crossing level converges to the ideal value ZCL along the line II.

Since the zero crossing level is optimally adjusted according to the present invention, it will be no longer close to either side of the sampled signals. Therefore, the influence of the floating signals on the system will be minimized. In other words, the detector 13 shown in FIGS. 1 or 2 can accurately determine the level of an input signal according to the levels of the sampled signals relative to the accurate zero crossing level, and properly output either a high level or a low level signal accordingly.

Figure 4:
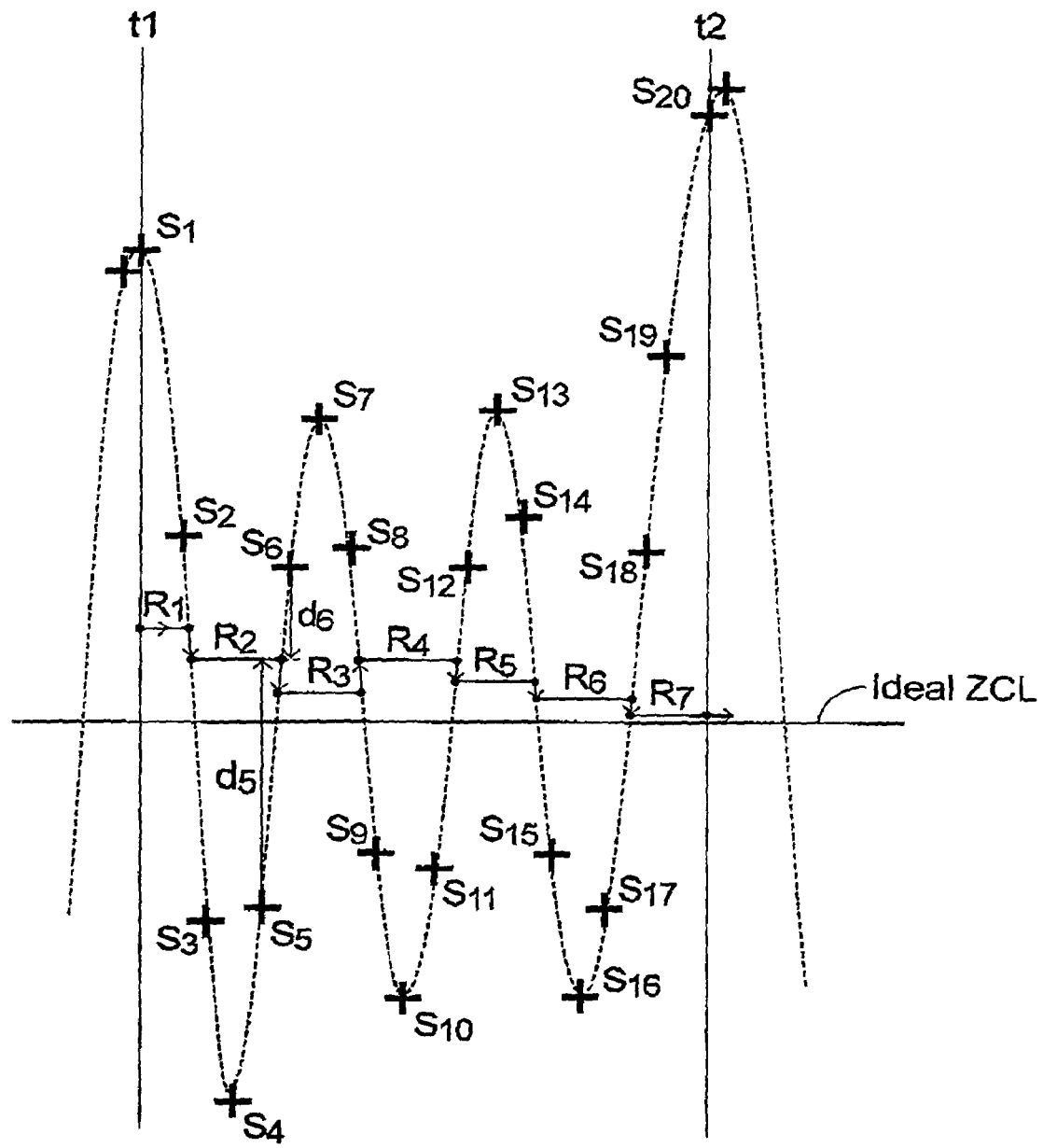
FIG. 4 is a partially enlarged plot of FIG. 3 showing the range from t1 to t2.

For further understanding of the present invention, an example is given with reference to FIG. 4, which is a partially enlarged plot of FIG. 3 showing the time range from t1 to t2. As shown, within the time period from t1 to t2, 20 sampled points S1~S20 are periodically obtained. It is assumed that the last sampled point is S6 and the latest reference level is R2. The total number of sampled signals generated within last certain time range and including the sampled point S6 are counted, e.g. the sampled points S1~S6. The number of the sampled signals S1~S6 having levels greater than the initial reference level R2 is counted as 3 (S1, S2 and S6), and the number of the sampled signals having levels less than the reference level R2 is also counted as 3 (S3, S4 and S5). Since the number of sampled signals having levels greater than the reference level equals to the number of sampled signals having levels less than the reference level, no adjustment is required and the rough-tuning procedure is done. In other words, the reference level R2 will be defined as the first-stage reference level. Afterward, the levels of the sampled points S5 and S6 are checked. It is found in FIG. 4 that the levels of the sampled points S5 and S6 lie in opposite sides of the first-stage reference level, so the fine-tuning procedure should be subsequently performed. In the fine-tuning procedure, the level shift d6 from the first-stage reference level R2 to the sampled point S6 and the level shift d5 from the first-stage reference level R2 to the sampled point S5 are calculated. Then, the new reference level R3 is obtained by the formula R3=R2+(d5+d6)×J. It is known from the plot that the level shift d6 has a positive sign and the level shift d5 has a negative sign, and the absolute value of the level shift d6 is less than the absolute value of the level shift d5. Therefore, the first-stage reference level R2 is inherently lowered by the operation of the formula to define the second-stage reference level R3. When next sampled point, i.e. S7, is inputted, the rough-tuning and fine-tuning procedures are supposed to be sequentially performed again. However, the fine-tuning procedure is skipped for the sampled points S7 and S8 because the sampled points S6, S7 and S8 are located at the same side of the reference level R3. When the sampled point S9 is inputted, the fine-tuning procedure is performed based on the reference level R3. Similar derivation can be applied to subsequent sampled points.

Although the adjusted reference level may occasionally deviate from the ideal zero crossing level, for example from R3 to R4, it will converge to the ideal zero crossing level eventually.

The present invention can be used in a photoelectric system such as a compact disk-read only memory (CD-ROM) drive, a compact disk-rewritable (CD-RW) drive, a digital versatile disk-read only memory (DVD-ROM) drive, a digital versatile disk-recordable (DVD-R) drive, a digital versatile disk-rewritable (DVD-RW) drive or a digital versatile disk-random access memory (DVD-RAM) drive. Furthermore, the rough-tuning and fine-tuning procedures and can be performed by hardware or by changing firmware such as control program of the photoelectric system.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for adjusting a reference level of an analog signal from a plurality of periodically sampled points, said method comprising steps of:

comparing a first number of sampled points having levels higher than an initial reference level with a second number of sampled points having levels lower than said initial reference level within a specified period;

raising said initial reference level when said first number is greater than said second number, and lowering said initial reference level when said first number is less than said second number, thereby obtaining a new reference level, and defining said new reference level as a first-stage reference level;

determining a first level shift from said first-stage reference level to a last second sampled point within said specified period and a second level shift from said first-stage reference level to a last sampled point within said specified period when one of a first level of said last second sampled point and a second level of said last sampled point is higher than said first-stage reference level and the other is lower than said first-stage reference level; and moving said first-stage reference level toward said first level when an absolute value of said first level shift is greater than an absolute value of said second level shift, and moving said first-stage reference level toward said second level when said absolute value of said first level shift is less than said absolute value of said second level shift, thereby defining a second-stage reference level.

2. The method according to claim 1 wherein said first-stage reference level is defined by adding a positive constant value to said initial reference level when said first number is greater than said second number or subtracting said positive constant value from said initial reference level when said first number is less than said second number.

3. The method according to claim 1 wherein said second-stage reference level is obtained by steps of:

summing said first level shift and said second level shift to obtain a sum of shift;

multiplying said sum of shift by an adjusting parameter to obtain a shifting value; and summing said first-stage reference level and said shifting value to obtain said second-stage reference level.

4. The method according to claim 1 wherein said steps are repeated for next sampled point by using said second-stage reference level as said initial reference level.

5. The method according to claim 1 wherein said step of comparing said first number with said second number and said step of raising/lowering said initial reference level are repetitively performed with said new reference level in lieu of said initial reference level until said first number is equal to said second number, and the latest reference level resulting in the equality of said first number to said second number is defined as said first-stage reference level.

6. The method according to claim 1 wherein said initial reference level is preset before said comparing step is performed.

7. The method according to claim 1 for use in a photoelectric system, wherein said analog signal is a radio frequency (RF) signal.

8. The method according to claim 1 for use in a photoelectric system to adjust a zero-crossing level.

9. The method according to claim 1 for use in a photoelectric system, wherein said photoelectric system is a compact disk-read only memory (CD-ROM) drive, a compact disk-rewritable (CD-RW) drive, a digital versatile disk-read only memory (DVD-ROM) drive, a digital versatile disk-recordable (DVD-R) drive, a digital versatile disk-rewritable (DVD-RW) drive or a digital versatile disk-random access memory (DVD-RAM) drive.

10. A method for adjusting a reference level of an analog signal from a plurality of periodically sampled points, said analog signal being generated by a photoelectric system, said method comprising steps of:

determining a first level shift from a preliminary reference level to a last second sampled point within a specified period and a second level shift from said preliminary reference level to a last sampled point within said specified period when one of a first level of said last second sampled point and a second level of said last sampled point is higher than said preliminary reference level and the other is lower than said preliminary reference level; and moving said preliminary reference level toward said first level when an absolute value of said first level shift is greater than an absolute value of said second level shift, and moving said preliminary reference level toward said second level when said absolute value of said first level shift is less than said absolute value of said second level shift, thereby defining an adjusted reference level.

11. The method according to claim 10 wherein said step of moving said preliminary reference level comprises sub-steps of:

summing said first level shift and said second level shift to obtain a sum of shift;

multiplying said sum of shift by an adjustment parameter to obtain a shifting value; and summing said preliminary reference level and said shifting value to obtain said adjusted reference level.

12. The method according to claim 10 further comprising a step of obtaining said preliminary reference level by sub-steps of:

comparing a first number of sampled points having levels higher than an initial reference level with a second number of sampled points having levels lower than said initial reference level within said specified period; and adding a positive constant value to said initial reference level to obtain said preliminary reference level when said first number is greater than said second number, and subtracting said positive constant value from said initial reference level to obtain said preliminary reference level when said first number is less than said second number.

13. The method according to claim 10 further comprising a step of obtaining said preliminary reference level by sub-steps of:

comparing a first number of sampled points having levels higher than an initial reference level with a second number of sampled points having levels lower than said initial reference level within said specified period;

adding a positive constant value to said initial reference level when said first number is greater than said second number, and subtracting said positive constant value from said initial reference level when said first number is less than said second number, thereby obtaining a new reference level;

using the new reference level in lieu of said initial reference level, and repeating the above steps until said first number is equal to said second number;

defining the latest reference level resulting in the equality of said first number to said second number as said preliminary reference level.

14. A digital signal processing device for use in a photoelectric system, comprising:

an analog-to-digital converter for converting an analog signal into a plurality of periodically sampled signals in digital forms;

a zero-crossing level tracking circuit in communication with said analog-to-digital converter, determining a first level shift from an preliminary reference level to a last second sampled point within a specified period and a second level shift from said preliminary reference level to a last sampled point within said specified period when one of a first level of said last second sampled point and a second level of said last sampled point is higher than said preliminary reference level and the other is lower than said preliminary reference level, said zero-crossing level tracking circuit moving said preliminary reference level toward said first level when an absolute value of said first level shift is greater than an absolute value of said second level shift, and moving said preliminary reference level toward said second level when said absolute value of said first level shift is less than said absolute value of said second level shift, thereby defining an adjusted reference level; and a detector in communication with said zero-crossing level tracking circuit, determining a level of said analog signal based on said adjusted reference level.

15. The device according to claim 14 wherein said zero-crossing level tracking circuit further performs operations of:

summing said first level shift and said second level shift to obtain a sum of shift;

multiplying said sum of shift by an adjustment parameter to obtain a shifting value; and summing said preliminary reference level and said shifting value to obtain said adjusted reference level.

16. The device according to claim 14 wherein said zero-crossing level tracking circuit further performs operations of:

comparing a first number of sampled points having levels higher than an initial reference level with a second number of sampled points having levels lower than said initial reference level within said specified period;

raising said initial reference level when said first number is greater than said second number, and lowering said initial reference level when said first number is less than said second number, thereby defining said preliminary reference level.

17. The device according to claim 14 further comprising a retiming system circuit in communication with said analog-to-digital converter for checking said sampled signals to determine whether the features of said analog signal are retained.

18. The device according to claim 14 further comprising a phase-locked loop circuit in communication with said analog-to-digital converter, generating a clock signal referenced by said analog-to-digital converter to generate said periodically sampled signals.

19. The device according to claim 14 wherein said analog signal is a radio frequency (RF) signal.

20. The device according to claim 14 wherein said photoelectric system is a compact disk-read only memory (CD-ROM) drive, a compact disk-rewritable (CD-RW) drive, a digital versatile disk-read only memory (DVD-ROM) drive, a digital versatile disk-recordable (DVD-R) drive, a digital versatile disk-rewritable (DVD-RW) drive or a digital versatile disk-random access memory (DVD-RAM) drive.

* * * * *